United States Patent [19]
Brocker et al.

[11] Patent Number: 5,365,606
[45] Date of Patent: Nov. 15, 1994

[54] VIRTUAL SOFTWARE MACHINE RUNNING MULTIPLE PROGRAM MODULES IN A SINGLE ADDRESS SPACE OF A TARGET COMPUTER

[75] Inventors: Thomas A. Brocker, Richardson; W. Jesse Furqueron, Irving; Bill L. Braswell, Plano, all of Tex.

[73] Assignee: Visystems, Inc., Dallas, Tex.

[21] Appl. No.: 800,503

[22] Filed: Nov. 27, 1991

[51] Int. Cl.$^5$ .............................................. G06F 9/06
[52] U.S. Cl. ............................ 395/650; 364/DIG. 1; 364/232.1; 364/256.3; 364/281.7
[58] Field of Search ................. 364/DIG. 1; 395/650, 395/800

[56] References Cited

U.S. PATENT DOCUMENTS

| | | | |
|---|---|---|---|
| 4,205,371 | 5/1980 | Feather | 364/DIG. 1 |
| 4,525,780 | 6/1985 | Bratt et al. | 364/DIG. 1 |
| 4,714,995 | 12/1987 | Materna et al. | 364/DIG. 1 |
| 4,727,480 | 2/1988 | Albright et al. | 364/DIG. 1 |
| 4,791,558 | 12/1988 | Chaitin et al. | 364/DIG. 1 |
| 4,792,895 | 12/1988 | Tallman | 364/DIG. 1 |
| 4,800,521 | 1/1989 | Carter et al. | 364/DIG. 2 |
| 4,875,186 | 10/1989 | Blume, Jr. | 364/DIG. 2 |
| 4,961,133 | 10/1990 | Talati et al. | 364/DIG. 2 |
| 5,088,033 | 2/1992 | Binkley et al. | 364/DIG. 1 |

OTHER PUBLICATIONS

*Customer Information Control System–An Evolving System Facility*, B. M. Yelavich, 24 IBM Systems J., pp. 264–278, 1985.

Microfocus Product Announcement, *Microfocus Announces PC-CICS for the IBM PC*, Sep. 8, pp. 1–11, 1986.

*RealCICS User Manual*, Beta Draft, Jul. 3, 1986.

Triangle Software Company program specifications, *CICS/pc Desktop Development*, 1987.

Triangle Software Company program specifications, *CICS/pc*, 1986.

Matterhorn, Inc. product overview, *PC/HIBOL Release 2.0*, Jul. 1987.

Glenn Embrey, *COBOL Compiler Fits Micros and Mainframes*, Electronics, Aug. 11, pp. 118–119, 1983.

Datapro report, *OmniLink Electronic Mail–On–Line Software International*, Oct. 1984.

On–Line Software International manual, *IntelaGen–The Programmer's Source Code Generator*, Jan. 1987.

Multi Solutions, Inc. technical manual, *S1–The Only Truly Authentic Microcomputer Operating System*, 1984.

IBM, *Systems Application Architecture–An Overview*, Apr. 27, 1987.

(List continued on next page.)

*Primary Examiner*—Thomas M. Heckler
*Attorney, Agent, or Firm*—Baker & Botts

[57] ABSTRACT

An enhanced virtual software machine that provides a virtual execution environment in a target computer for application software programs having execution dependencies incompatible with a software execution environment on the target computer. The machine comprises a plurality of independent processes, a management interface for generating requests for execution to the plurality of independent processes and receiving results of such processing, and a preprocessor for generating a set of native executable program modules. According to one embodiment, the virtual software machine binds a task manager control module into a single address space of the target computer operating system for each user that attaches to the system. Upon receipt of a transaction request, a dynamic binding facility dynamically binds one or more of the program modules into the single address space for scheduling and execution under the control of the task manager control module. At least one of the program modules calls the management interface upon encountering an execution dependency in the program module and effects the required functionality using an independent process. A task management library is also bound in the single address space and functions to preserve, release and/or restore a context of each of the one or more program modules loading into the single address space during execution of the program modules by the task manager control module.

3 Claims, 3 Drawing Sheets

OTHER PUBLICATIONS

D. D. Chamberlin et al., *Sequel 2:A Unified Approach to Data Definition, Manipulation, and Control*, IBM J. Res. Develop., pp. 560–575, Nov. 1985.

Gartner Group research note, *DB2 Release 2–Preliminary Analysis*, Software Management Strategies, Feb. 12, 1986.

IBM product announcement, *IBM Database 2 (DB2) Version 2*, Apr. 19, 1988.

Unicorn Systems Company product description, *MicroCICS*, Nov. 5, 1984.

Brandy C. De Shazo. *Personal CICS*, Tech Journal;. Dec. 1985.

A. T. Twigger of Root Computers Limited, *Porting a CICS Application to UNIX*, Jun. 1985.

Root Business Systems, *UniTECS–Product Description*, 1986.

Unisoft Limited manual, *UniTECS User Guide*, 1987.

UniSoft Limited manual, *UniTECS Migration Guide*, 1987.

UniSoft Limited manual, *UniTECS User Reference Manual*, 1987.

UniSoft Limited manual, *UniTECS Application Programmer's Reference Manual*, 1987.

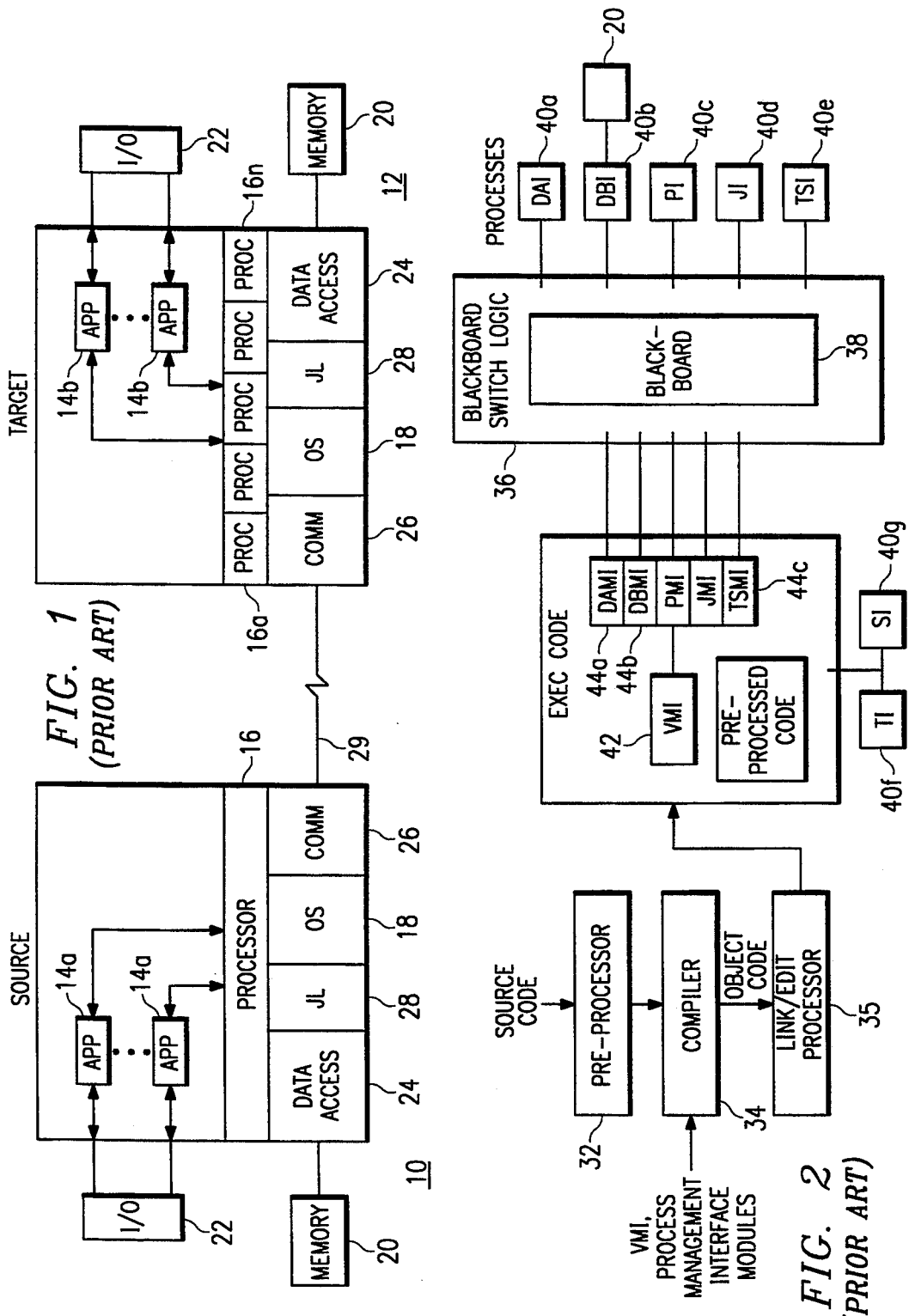

VIRTUAL SOFTWARE MACHINE RUNNING MULTIPLE PROGRAM MODULES IN A SINGLE ADDRESS SPACE OF A TARGET COMPUTER

TECHNICAL FIELD

The present invention relates generally to computer systems and more particularly to a virtual interface architecture for porting application software, normally compatible with a "source" computer, to a heterogeneous or "target" computer.

BACKGROUND OF THE INVENTION

Computer systems having homogeneous hardware can interact and share data over a network. For example, a "local area network" can connect two or more computers located in physical proximity to enable users to access a shared database. Moreover, it has also been possible in the prior art to exchange software between identical types of machines. To the contrary, most interactions between heterogeneous machines still involve little more than simple transfers of data files or the like. Software applications written for one type of hardware or for one specific type of operating environment, however, cannot be ported or "transferred" to a system having different physical characteristics without being entirely rewritten. Therefore, while much progress has been made in developing techniques for exchanging data between incompatible machines, it has not been possible to exchange software between heterogeneous computer systems.

There have been a number of solutions proposed to overcome the "compatibility" problems associated with the enormous array of prior art computer systems having diverse and incompatible hardware and/or software. One solution is the use of a single operating system along a continuum of hardware products from microcomputer to mainframe. Although this approach is a satisfactory solution with respect to the products of an individual manufacturer, it does not allow the transfer of software applications across incompatible hardware and operating system environments. Another alternative would be the creation of a common communication environment across distributed systems through use of a standard industry-wide protocol. While some efforts have been made to generate standards for such a protocol, this solution presents complex technological problems.

An interface system that provides application program portability and consistency across diverse computer environments is known in the prior art and described in U.S. Pat. No. 4,961,133 to Talati et al, which is assigned to the assignee of this application. While the virtual interface system described in U.S. Pat. No. 4,961,133 has proven extremely advantageous, there remains a need to provide enhancements to this system to reduce operating system resource consumption and increase transaction time. It is a primary object of this invention to describe such enhancements.

BRIEF SUMMARY OF THE INVENTION

A virtual software machine according to the invention provides a virtual execution environment in a target computer for application software programs having execution dependencies incompatible with a software execution environment on the target computer. The machine comprises a plurality of independent processes, a management interface for generating requests for execution to the plurality of independent processes and receiving results of such processing, and a preprocessor for generating a set of native relocatable and executable program modules. According to one embodiment of the invention, the virtual software machine binds a task manager control module into a single address space of the target computer operating system for each user that attaches to the system. Upon receipt of a transaction request, a dynamic binding facility dynamically binds one or more of the program modules into the single address space for scheduling and execution under the control of the task manager control module. At least one of the program modules calls the management interface upon encountering an execution dependency in the program module and effects the required functionality using an independent process. A task management library is also bound in the single address space and functions to preserve, release and/or restore a context of each of the one or more program modules loading into the single address space during execution of the program modules by the task manager control module.

BRIEF DESCRIPTION OF THE DRAWINGS

For a more complete understanding of the present invention and the advantages thereof, reference is now made to the following description taken in conjunction with the accompanying drawings in which:

FIG. 1 is a block diagram of a source computer and a heterogeneous or "target" computer;

FIG. 2 is a simplified block diagram of a prior art virtual interface system for providing application program portability and consistency across the source and target computers of FIG. 1;

DETAILED DESCRIPTION

Figure 3:
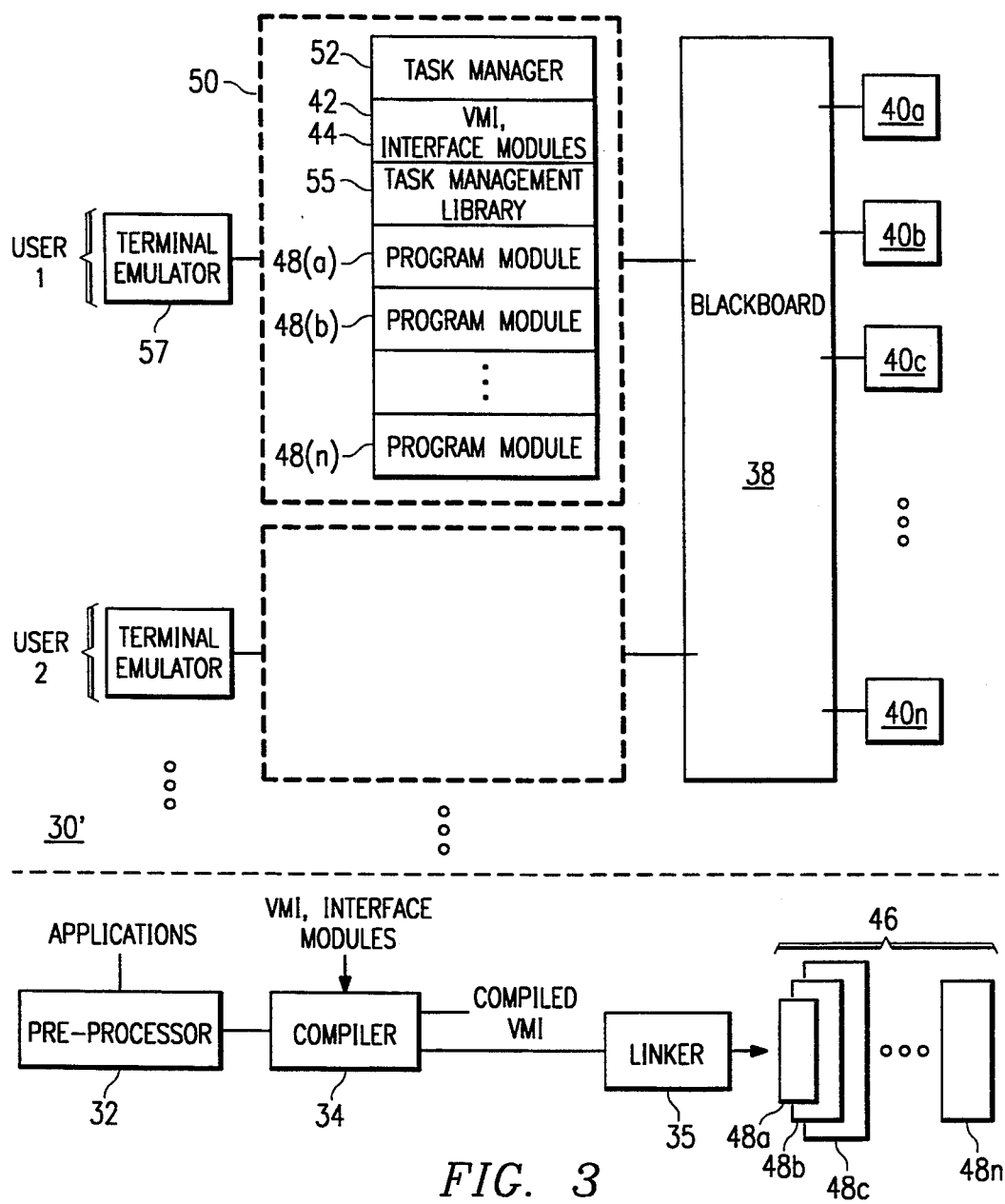
FIG. 3 is a simplified block diagram of a modified virtual interface system according to the teachings of the present invention.

By way of brief background, FIG. 1 is a simplified block diagram of a "source" computer 10 and a heterogeneous or "target" computer 12. "Heterogeneous" refers to the fact that application program(s) 14a written for the source computer 10 cannot be run on the target computer 12 because computers 10 and 12 are incompatible at the hardware and/or software level. For example, and not by way of limitation, source computer 10 may comprise a transaction processing system such as IBM's CICS (Customer Information Control System) whereas the target computer 12 may include non-IBM hardware running a UNIX operating system.

Each of the computers 10 and 12 includes one or more integrated or distributed processors 16a–16n capable of receiving and manipulating data and generating outputs, operating system software 18 which controls the operation of the overall computer system, memory (e.g., a disc drive and a suitable disk storage) 20 for storing data and application programs, input/output devices (e.g., keyboards, printers, CRT's, etc.) 22 for enabling a user to interact with the system, database management system 24 for controlling access to and storage of data, communications system 26 for controlling communications to and from the computer system via network 29 for example, and journal system 28 for storing and retrieving data from a journal. The virtual interface architecture of U.S. Pat. No. 4,961,133 provides the capability to port application programs 14a (normally compatible with the source computer 10) to the target computer 12 and vice-versa, without modifications or programming changes to such programs.

By way of additional background, the virtual interface system of U.S. Pat. No. 4,961,133 is shown in the simplified block diagram of FIG. 2. Virtual interface system 30 enables the application programs 14a to be executed without regard to whether such programs are compatible with the processor(s) 16, operating system 18, storage devices 20, input/output devices 22, data access system 24, communications system 26 or journal system 28 of the target computer system 12. System 30 comprises a preprocessor 32, a compiler 34 for generating object code compatible with (but not executable by) the operating system of the target computer 12, a link/edit processor 35 for linking various object code programs to create fully-resolved core image code ("EXEC CODE") executable by the operating system of the target computer, a blackboard switch logic 36, a partitioned storage area 38, and a plurality of independent processes 40a–40n for running in the one or more processors 16 of the target computer system 12. Each of the processes 40 comprises an independently schedulable unit of computation which, in conjunction with one or more other processes, carries out one or more "tasks" required by the application program. Each task therefore consists of one or more independent processes.

The blackboard switch logic 36 is controlled by the operating system 18 of the target computer 12 to generate the partitioned storage area 38, or "blackboard". The blackboard switch logic 36 is the conduit for all communications to and from the processes 40a–40n and all such communications generally flow through the blackboard switch logic 36 to the partitioned storage area 38, or from the partitioned storage area through the blackboard switch logic. The routing of data and information through the blackboard switch logic 36 and the partitioned storage area 38 is controlled by the executable code ("EXEC CODE") output from the link/edit processor 35. The executable code comprises linked object code programs representing (a) preprocessed program code of the application program, (b) a virtual management interface ("VMI") 42, and (c) a plurality of process management interface modules 44a–44n. The object code representing the VMI 42 and the plurality of process management interface modules 44 is generated by the compiler 34. The process management interface modules 44 control the processes 40 via the blackboard switch logic 36 and the partitioned storage area 38. Processes 40 and the executable code are capable of being executed in the target computer 12 but generally not in the source computer 10.

In operation, the source code of an application 14a is applied to the preprocessor 32, which identifies the functional calls (i.e., tasks) in the program code and converts these functional calls to functional calls of the language native to the target computer (i.e., to the compiler 34). For example, if the application program 14a is a CICS application and the target computer is "C"-based, preprocessor 32 serves to format the CICS functional calls in the source code to "C" calls. Of course, other types of calls (e.g., in ADA, Assembler, COBOL) can be implemented as well and the application programs are not restricted to COBOL or C as the source language.

After compilation and linking, the resulting "EXEC CODE" comprises a plurality of calls to the virtual management interface 42 (and thus the process management interface modules) for carrying out the tasks required by the application program. At "run-time," the executable code (and thus the virtual management interface 42) is run by the operating system 18 of the target computer 12 to call one or more of the process management interface modules 44a–44n as required by the application software task(s). Each of the process management interface modules then communicates with the one or more processes 40a–40n via the blackboard switch logic 36 and blackboard 38 to perform the task.

When the virtual software machine of FIG. 2, by way of example only, interfaces a CICS transaction processing system to a UNIX-based target computer 12, the EXEC CODE is normally associated with a single CICS application. In addition, the EXEC CODE for the single application is supported in a single address space of the UNIX operating system and thus appears as a single schedulable unit of work to the operating system. According to the present invention, an enhancement to this virtual software machine enables multiple user applications (e.g., CICS programs) to run in a single UNIX "process" within a single shared address space. This operation provides significantly reduced operating system resource consumption and thus increased transaction throughput and processing.

With reference now to FIG. 3, the virtual software machine 30' includes the preprocessor 32, the compiler 34 and the link editor 35 as previously described. Each of a plurality of CICS application programs (usually written in COBOL) are preprocessed to identify embedded EXEC CICS commands and to replace such commands with calls to the virtual management interface or VMI. Following preprocessing, the programs are compiled into object code by the compiler 34. The VMI 42 and the process management interface modules 44 are also compiled as before but, as will be described, need not be statically-linked with each preprocessed application program module. The link editor 35 prepares the object code for each application program module into a form compatible with a dynamic binding facility of the target computer operating system. The link editor may also statically link other modules required by the application and it serves to establish a list of elements (including the VMI) that must be resolved later at run-time. With the dynamic binding facility, program calls to one or more external references required by the program are resolved at run-time (as opposed to during the static link process). The output of the link editor 35 is a set 46 of preprocessed application program modules 48 each preferably relocatable and executable by methods native to the target computer operating system. If desired, some of the program modules may be statically-linked by the editor 35 prior to run-time. In the CICS-to-UNIX example being described, this preprocessing takes a plurality of CICS user applications 31 and generates a plurality of native UNIX relocatable and executable program modules 48.

According to the invention, one or more of the native UNIX executable program modules 48 are dynamically relocated and "bound" into a single address space 50 during run-time. In particular, and as seen in FIG. 3, the virtual software machine 30' includes a single address space 50 for each user who connects to the system. A task manager control module 52 is statically or dynamically linked bound into the single address space 50, as are the VMI 42 and the process management interface modules 44. Task manager control module 52 oversees the scheduling and execution of one or more of the native relocatable and executable program modules 48(a)–48(n). The program modules(s) are bound into the single address space 50 during run-time using the dynamic binding facility of the UNIX-based operating system. This binding facility allows multiple applications to be invoked in a relocatable manner within a single address space. The dynamic binding facility is provided by some implementations of the shared library facility in Version 5.3 of the UNIX operating system. A similar facility is provided in UNIX Version 5.4 under the name "dynamic libraries."

According to another feature of the invention, each single address space also supports a task management co-routine library 55 that enables each of the native relocatable and executable program modules 48 to execute within its own "context" in the single address space 50. In particular, each of the program modules 48 has a predetermined "context" that exists when the module is brought into execution by the operating system. This context generally refers to the various pointers to data structures and areas that are required by the application for execution. This program context must be preserved if and when control is transferred from a first program module to a second program module dynamically linked into the single address space. Such transfer of control could occur, for example, if an EXEC CICS LINK command statement is encountered when the first program module is executing. Moreover, the program context of the first program module must also be restored (and the context of the second program module is released) if and when control is to be returned from the second program module back to the first program module. According to the invention, the task management library 55 provides the means for resolving (i.e., either preserving, releasing and/or restoring) the context of each program module executing within the single address space 50.

Accordingly, the single address space 50 thus supports an aggregate of modules: the task manager control module 52, the VMI 42, the process management interface modules 44, one or more native relocatable and executable program modules 48 and the task management library 55. Collectively, these modules form a task management "process".

In the embodiment of FIG. 3, each user typically attaches to the system through a terminal controller 57. Upon connection to the system, an address space is assigned to the user and the task manager control module 52, the VMI 42, the process management interface modules 44, and the task management library 55 are bound into the address space 50. The various CICS applications have of course been previously preprocessed, compiled and linked to create the set 46 of relative relocatable and executable program modules 48. During run-time, a user will request a transaction that must be effected using one of more of the CICS applications. In response, the virtual software machine 30' loads the program module 48(a) into the address space 50. As program module 48(a) is executed under the control of the task manager process 52, one or more CICS execution dependencies are encountered. When all execution dependency is encountered, the VMI 42 is called, which in turn calls the process management interface modules 44 to effect the required CICS functionality via one of the independent processes 40. This operation is described in U.S. Pat. No. 4,961,133, which is incorporated herein by reference.

If, during the execution of the first program module 48(a), an EXEC CICS LINK command statement is encountered, the task manager uses the dynamic binding facility to load the application program module 48(b) required. The task management library 55 preserves the context of program module 48(a) and transfers control to program module 48(b). Any CICS execution dependency encountered as module 48(b) executes is resolved by a call to the VMI as described above. Once module 48(b) completes its execution, control is restored to program module 48(a). Task management library 55 releases the context of module 48(b) and restores the context of module 48(a). Of course, program module 48(b) could likewise transfer control to another module.

The task management library 55 is implemented in the UNIX operating system preferably by a C++ co-routine library facility as more particularly described in AT&T Library Manual, Select Code No. 307-145 (1989), which is incorporated herein by reference. The task management library 55 allows each CICS program module to execute within its own context in a single UNIX process (i.e., the aggregation of the task manager control module, the VMI, the process management interface modules, the one or more program modules and the task management library). Communications between each of the program modules is enabled through a queuing mechanism/message passing scheme from a queuing library that is part of the task management library 55. The task management library 55 can also be implemented using a DCE (distributed computing environment) thread facility One type of DCE thread facility is employed in the Open Software Foundation's operating system, as widely reported in the trade press. Of course, these specific facilities are provided for illustrative purposes only and not by way of limitation.

Thus, according to the invention multiple program modules execute within a single address space but each maintains its own individuality or context. This architecture provides several advantages. It reduces execution overhead by enabling the multiple applications to be loaded into a single address space. Multiple program contexts are preserved, released and restored across the program module executions (although the applications themselves may or may not be threaded). Transaction throughput is significantly increased and individual transaction time is reduced. Significantly, the use of the task manager control module and the C++ co-routine library in the manner described advantageously applies object-oriented processing concepts to a transaction processing environment.

Figure 4:
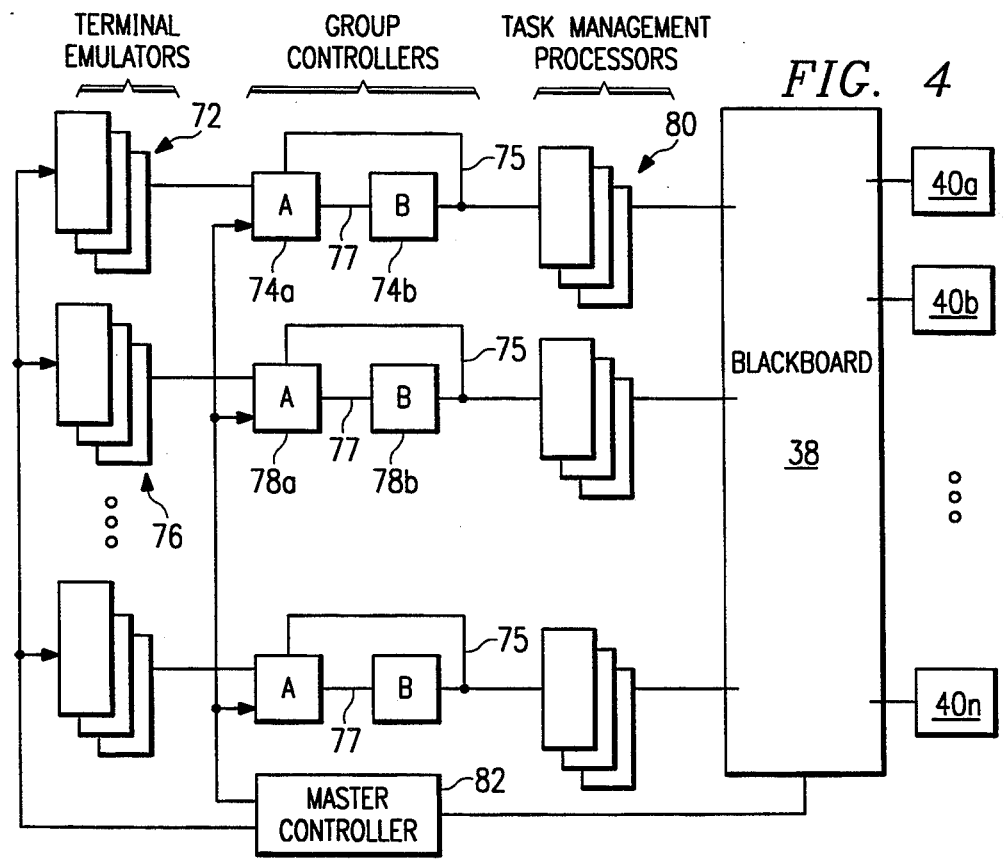
FIG. 4 is a simplified block diagram of yet another virtual interface system according to the invention.

As noted above, in the embodiment of FIG. 3 each user typically attaches to the system through a terminal emulator 57. Turning now to FIG. 4, an alternate embodiment is shown. In this embodiment, virtual software machine includes the preprocessor, compiler and link editor as previously described although for simplicity these elements are not shown. Rather than connecting a single terminal emulator to each task management process, a plurality of terminal emulator processes (e.g., 32) are grouped together and then interconnected to the virtual software machine through a pair of group controllers. With reference to FIG. 4, a first group 72 of user terminal emulators is connected to the virtual software machine through a pair of group controllers 74a and 74b. A second group 76 of user terminal emulators is connected to the virtual software machine through a pair of group controllers 78a and 78b. Other groups of user terminal emulators are connected in a similar fashion, and a task management process is generated each time a user attaches to the system. Thus, for each user terminal emulator of the group 72 of terminals, a corresponding address space and task management process 80 is created as described above with respect to FIG. 3.

Referring back to FIG. 4, group controller 74a communicates with each of the user terminal emulators in the group 72, and it also communicates to the group controller 74b via line 77. Group controller 74b communicates to the virtual software machine (and specifically to each task management process 80 generated as each user of the group 72 is attached to the system). Group controller 74a can talk to a task management process (via line 75) but cannot receive data therefrom. Information from a task management process is thus delivered back to the user interface by passing through the group controller 74b and then through the group controller 74a via line 77. A master controller 82 is used to manage the start up and shutdown of the group controllers (namely 74a, 78a, etc.) that interface to the user terminal emulator groups. The group controller (e.g., 74a) that interfaces to the terminal emulators also serves to start up the group controller 74b and the associated task management processes. The master controller is also attached to the blackboard 38. Each of the task management processes also communicates with the blackboard by calls to the VMI as previously discussed.

The architecture of FIG. 4 is advantageous because it allows the terminal emulators to be removed from the platform on which the virtual software machine is supported. This significantly increases the processing time of time virtual software machine.

Figure 5:
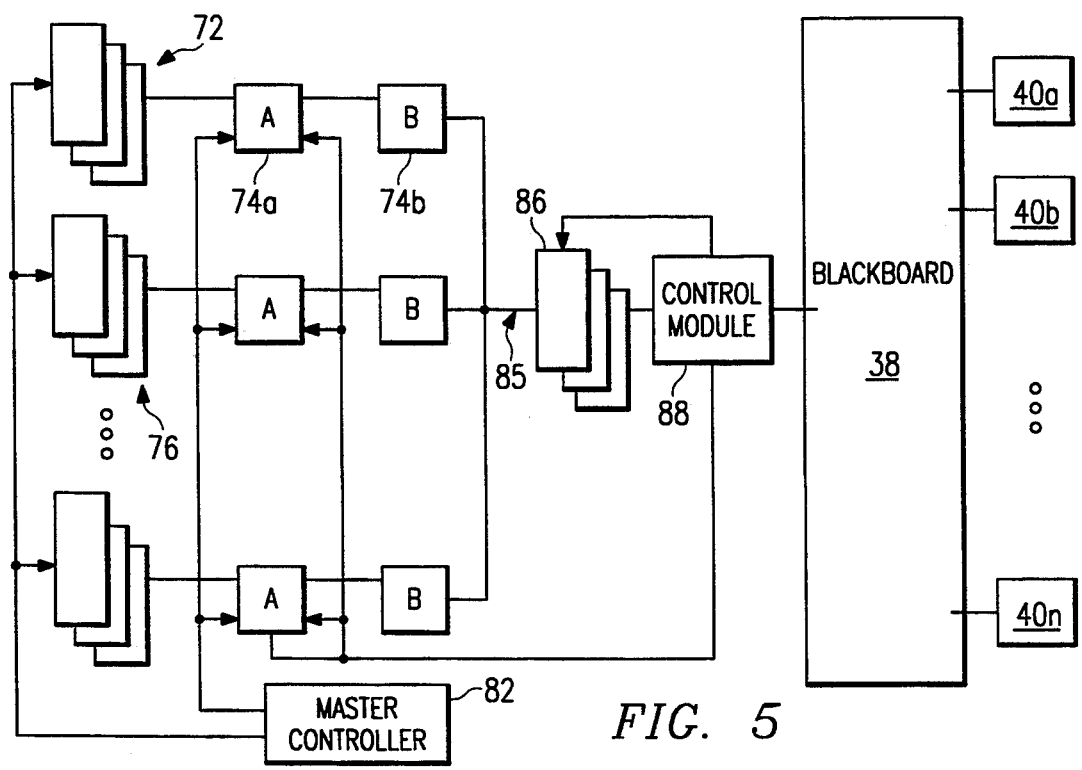
FIG. 5 is a simplified block diagram of still another embodiment of the virtual interface system of the present invention.

Yet another embodiment of time invention is shown in FIG. 5. In this embodiment, the individual groupings of user terminal emulators are again interfaced to pairs of group controllers as described in FIG. 4. In this embodiment, however, each of the group controllers that interface to the task management processes are themselves interconnected via bus 85 such that the plurality of user terminal emulators can be multiplexed to the task management processes. In this manner, each user that attaches to the system is only specifically associated with a single task management process for the life of the transaction. Thus, the plurality of task management processes 86 are sharable and individually accessible by more than one user attached to the virtual software machine. Each task management process 86 is of course connected to the blackboard to effect the VMI calls. In this embodiment, an additional control module 88 starts each of the task management processes 86 and also serves to control the group controllers that interface with the user terminals. In particular, access to an individual process 86 is scheduled and controlled by the control module 88. The master controller 82 controls the group controllers that interface to the terminal emulator groups. Each process 86 is supported in a single address space and includes the aggregate structure as described above with respect to FIG. 3.

Although the invention has been described and illustrated in detail, the same is by way of example only and should not be taken by way of limitations. For example, it may be desirable to implement a task management library function in connection with one or more of the independent processes 40 of the virtual software machine to facilitate the sharing of these processes by more than one task manager process or maxtask process. The spirit and scope of the present invention are limited only to the terms of the appended claims.

What is claimed is:

1. In a method, using a virtual software machine, for providing a virtual execution environment in a target computer system for application software programs having one or more execution dependencies that are incompatible with a software execution environment on the target computer system, the virtual software machine comprising a plurality of independent processes, a management interface for generating requests for execution to the plurality of independent processes and for receiving results of such processing, and preprocessing means for identifying execution dependencies of the application software programs and in response thereto generating a set of program modules, the improvement comprising the steps of:

binding a task manager control module into a single address space of the target computer software execution environment;

in response to a transaction request, dynamically binding one or more of the program modules into the single address space for scheduling and execution under the control of the task manager control module, wherein at least one of the program modules calls the management interface upon encountering an execution dependency in the program module; and resolving a context of each of the one or more program modules loading into the single address space during execution of the program modules by the task manager control module.

2. In the method as described in claim 1 wherein the application software programs are written in CICS and the target computer system software execution environment is UNIX-based.

3. In the method as described in claim 2 wherein each of the program modules is a native UNIX relocatable and executable module.

* * * * *